(12) United States Patent
Wang et al.

(10) Patent No.: US 8,666,558 B2
(45) Date of Patent: Mar. 4, 2014

(54) HYBRID DISTRIBUTION NETWORK POWER RESTORATION CONTROL

(75) Inventors: Zhenyuan Wang, Cary, NC (US);
James Stoupis, Durham, NC (US);
Vaibhav Donde, Raleigh, NC (US);
Wenping Li, Cary, NC (US); William Peterson, Cary, NC (US)

(73) Assignee: ABB Research Ltd., Zurich (CH)

( * ) Notice: Subject to any disclaimer, the term of this patent is extended or adjusted under 35 U.S.C. 154(b) by 770 days.

(21) Appl. No.: 12/645,506

(22) Filed: Dec. 23, 2009

(65) Prior Publication Data
US 2011/0004355 A1 Jan. 6, 2011

Related U.S. Application Data

(60) Provisional application No. 61/141,826, filed on Dec. 31, 2008.

(51) Int. Cl.
*G05D 11/00* (2006.01)

(52) U.S. Cl.
USPC .......................................... 700/286; 700/292

(58) Field of Classification Search
USPC ........................ 700/286, 291–295; 361/62–66
See application file for complete search history.

(56) References Cited

U.S. PATENT DOCUMENTS

| | | |
|---|---|---|
| 2007/0226290 A1 | 9/2007 | Khorramshahi |
| 2008/0103732 A1 | 5/2008 | Stoupis et al. |
| 2008/0183339 A1 | 7/2008 | Vaswani et al. |
| 2008/0224546 A1 | 9/2008 | TeSelle et al. |
| 2008/0225452 A1 | 9/2008 | Stoupis et al. |
| 2010/0094573 A1 | 4/2010 | Yang et al. |

FOREIGN PATENT DOCUMENTS

| | | |
|---|---|---|
| CN | 1726626 A | 1/2006 |
| WO | 2004040731 A1 | 5/2004 |
| WO | 2008067299 A2 | 6/2008 |
| WO | 2008115342 A1 | 9/2008 |
| WO | 2010078132 A3 | 7/2010 |

OTHER PUBLICATIONS

Hurtado-Albir, F, International Searching Authority (EPO), International Search Report and Written Opinion of the International Searching Authority for corresponding International Application No. PCT/US2009/069096, European Patent Office, mailed Jul. 23, 2010.
G. Desantis, Reply to Communication pursuant to Rule 161 EPC in corresponding European Application No. 09796563.6-2207, Mar. 7, 2012.
The Patent Office of the People's Republic of China, Office Action for corresponding Chinese patent application No. 200980153495.9, Jun. 3, 2013.

*Primary Examiner* — Mohammad Ali
*Assistant Examiner* — Nathan Laughlin
(74) *Attorney, Agent, or Firm* — Steven W. Hudnut; Michael C. Prewitt

(57) ABSTRACT

A power outage restoration system manages a power network including a plurality of switching devices. The power outage restoration system includes an outage management system having a network model of said power network. A plurality of local restoration controllers are in communication with the outage management system and each said local restoration controller includes a trimmed network model correlating to a respective area of responsibility.

15 Claims, 4 Drawing Sheets

HYBRID DISTRIBUTION NETWORK POWER RESTORATION CONTROL

This application claims priority to U.S. Provisional Application No. 61/141,826 filed on Dec. 31, 2008 and titled Hybrid Distribution Network Power Restoration Control, the contents of which are incorporated by reference in their entirety.

TECHNICAL FIELD

The present invention relates to the power restoration control of an electric distribution system after an outage. Specifically, the present invention relates to the efficient use of outage management systems (OMS) and feeder automation systems (FA).

BACKGROUND

Reliability indices of an electric distribution system, especially the System Average Interruption Duration Index (SAIDI) and Customer Average Interruption Duration Index (CAIDI), are one the major measures of power utility performance. The SAIDI is generally defined as the average outage duration for each utility customer served. The CAIDI is a measure of the average customer outage time, other wise known as an average restoration time. These performance indicators are often tied to rate increases or other monetary incentives for power utilities. Thus, it is imperative that power utilities minimize the scope and duration of power outages to maintain optimal SAIDI and CAIDI values.

One method of maintaining high network reliability is by properly maintaining the physical system components such as transformers, circuit breakers, overhead lines, etc. The other major contributor to network reliability indices is fault response. Specifically, it is important to quickly restore service to load zones that are not at fault, but experience a power interruption because of a fault elsewhere on the power network.

In many utility network grids, fault response is administered by an outage management system (OMS). These OMS systems locate faulted zones using customer phone calls using sophisticated tracing algorithms. The OMS systems then rely on dispatchers to execute a restoration switching analysis (RSA) to determine a service restoration switching plan. A service restoration switching plan includes one or more network switching instructions which, when performed, restores power to one or more load zones. The switch open/close commands may be executed automatically/electronically, through a supervisory control and data acquisition (SCADA) system or by communications between dispatchers and mobile ground crews.

The SCADA and OMS systems are part of the distribution management system (DMS). The response time of the DMS to an actual outage is determined by many factors, including the number and location of tele-metered components in the field, the number and location of remote-controllable switching devices in the fields, the number and location of dispatchable crews on the ground. Perhaps the most important response time variable is how an outage is determined in the DMS and how the switching operations are executed. Because human interaction is required at each step of the process, the restoration time is often at least several minutes or more. By involving human interaction, fault locating and restoration may be more nuanced, but overall restoration time reduction is negatively impacted.

The use of automatic reclosers greatly improves the reliability of the overhead distribution system by eliminating the need of human involvement in case of temporary/intermittent faults. Reclosers, upon sensing a fault, open much like a circuit breaker. After a predetermined amount of time, the recloser attempts to close. This process is repeated until the fault is cleared or until a preset number of attempted closing events are counted, at which time the recloser remains open. In this manner, many intermittent faults that would ordinarily cause a power outage are cleared without permanent loss of power. However, reclosers cannot eliminate the need for back-feeding power restoration in case of permanent faults.

Smart protection and control relays, or intelligent electronic devices (IED), have been used to execute back-feeding switching controls though peer-to-peer or other communication methods. However, the technology can only be employed in simple distribution systems where back-feeding source capacity, back-feeding feeder loading capability, and other circuit constraints (such as voltage violation) are of minimal concern. Existing overhead distribution systems, especially relatively older networks, are often much more complicated than these simple distribution system models.

It is therefore advantageous to provide an automated system that is capable of performing RSA and restoration functions in more complex networks.

SUMMARY OF THE INVENTION

According to one aspect of the present invention, a power outage restoration system is provided for managing a power network including a plurality of switching devices. The power outage restoration system includes an outage management system having a network model of the power network, the outage management system includes an outage engine that uses the network model for determining restoration switching plans. A plurality of local restoration controllers are in communication with the outage management system, each of the local restoration controllers have a distinct local restoration controller area of responsibility which is a portion of the power network. Each of the local restoration controllers include a trimmed network model correlating to the respective local restoration controller area of responsibility. Each of the local restoration controllers further include a switching analysis engine that uses the trimmed network model for determining the restoration switching plans. The local restoration controller is operable to detect faults in the associated area of responsibility, and when a fault is detected, the respective local restoration controller switching analysis engine attempts to create a restoration switching plan. If the switching analysis engine fails, a request is sent to the outage management system for the outage engine to create a restoration switching plan.

According to another aspect of the present invention, a method of managing a power network is provided, the power network including a plurality of switching devices. The method includes providing an outage management system having a network model of the power network, the outage management system including an outage engine. Providing a plurality of local restoration controllers in communication with the outage management system, each of the local restoration controllers have a distinct local restoration controller area of responsibility which is a portion of the power network. Each of the local restoration controllers include a trimmed network model correlating to the respective local restoration controller area of responsibility. Each of the local restoration controllers further include a switching analysis engine. The local restoration controllers monitor the power network. If a fault occurs in an area of responsibility, the respective local restoration controller uses the switching analysis engine to determine a local restoration switching plan. If the local restoration switching plan is deficient, a global restoration switching plan is determined using the outage engine. The global or local restoration switching plan is then executed to restore power to one or more outaged sections of the power network.

According to still another aspect of the present invention, a method of managing a power network is disclosed, the power network includes a plurality of switching devices. The method includes detecting a fault on the power network. A restoration switching plan is created including a sequential series of switching operations including manual switching operations and remote controllable switching operations, the restoration switching plan is executable to isolate a faulted portion of the power network and to backfeed outaged portions of the power network. Each the switching operation is executed sequentially. If the switching operation is a manual switching operation, a command is transmitted to a ground crew to manually execute the switching operation. If the switching operation is a remote controllable switching operation, a switch command is transmitted to the switching device to execute the switching operation.

DETAILED DESCRIPTION OF THE INVENTION

Figure 1:
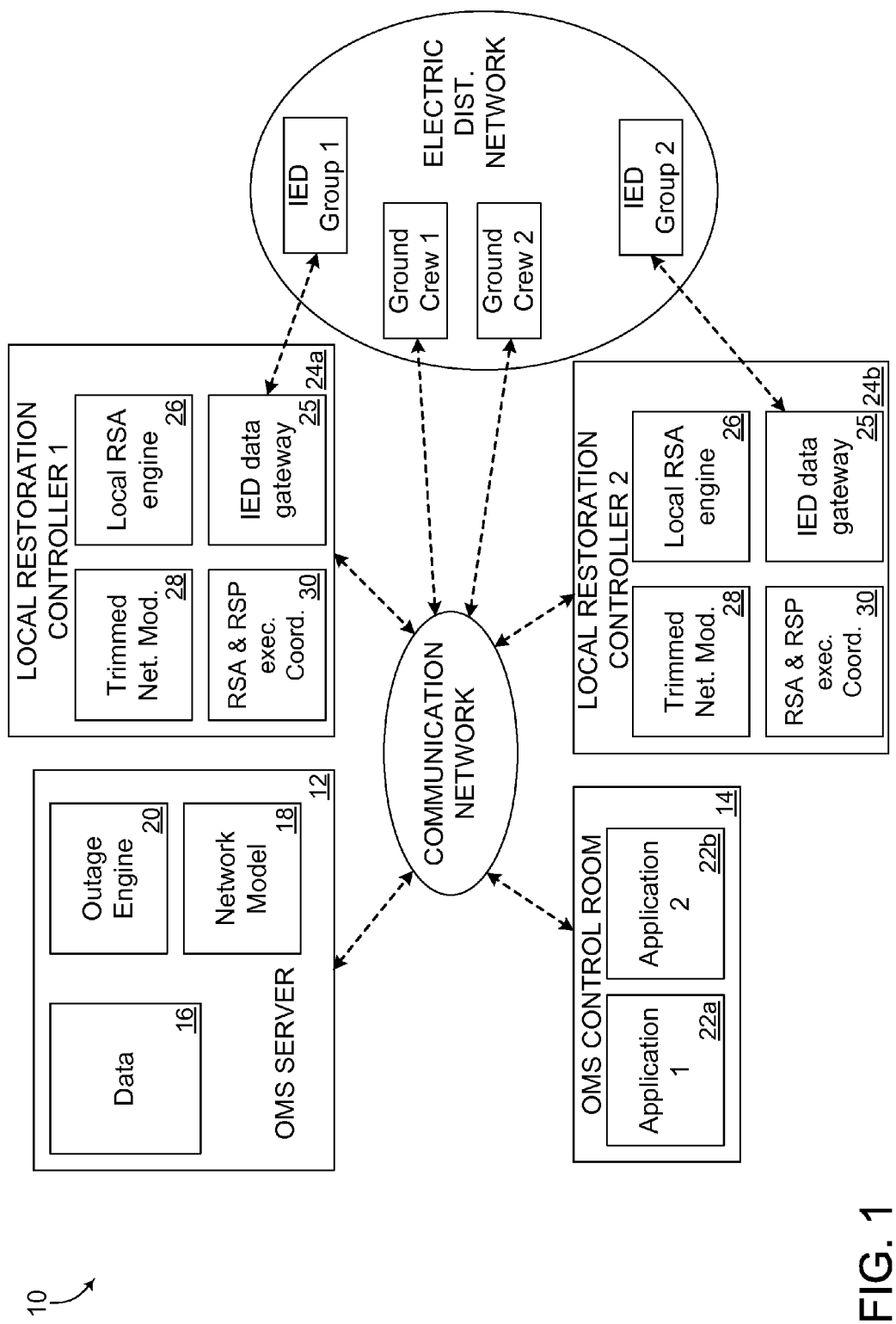
FIG. 1 is a partially schematic view of the hybrid restoration system according to the present invention.

A restoration system according to the present invention combines an outage management system (OMS) with feeder automation (FA) infrastructure to achieve a combined, hybrid restoration control. The restoration system is shown in FIG. 1 and is generally indicated by the numeral 10. Restoration system 10 includes an OMS server 12 that may include a data store 16 which may store, for example customer information, crew information, and other outage management related process data. The OMS server further includes a full network model 18 for the portion of a network which the OMS is responsible. The network model is a mathematical representation of the physical network components and their connecting relationships. For example, the model may include all the loads (nameplate information and load profiles), transformers (nameplate information and configurations), power sources (capacity), switching devices (type and loading capability) and the interconnections (conductor type, configuration, length, and impedance characteristics) therebetween. The OMS server further includes an outage engine 20 that receives and processes customer calls to determine where the faulted network sections are. It also determines likely fault locations where a ground crew should be directed to clear the fault condition and repair the circuit. The OMS server 12 is in communication with an OMS control room 14 having at least one computer running one or more applications, such as the applications 22a and 22b. The applications provide an interface between the OMS server and control room personnel (operator). For example, the application may be a graphical user interface GUI application from which the operator can view the present condition (energized/outaged sections) of the network, and run the RSA for an outaged network component. The operator may also create/view/modify/send network repair/reconfiguration instructions to ground crews.

System 10 further includes a plurality of local restoration controllers 24a and 24b. It should be appreciated that, though only two local restoration controllers are shown, more than two may be employed depending on the size and complexity of a given distribution network. Local restoration controllers 24 are industrial computers that reside remotely from the OMS server and control room. Each local restoration controller has an area of responsibility (AOR) in the distribution network. This area of responsibility may be, for example, the portion of a distribution network powered by a plurality of given substations and/or feeder sources. In other embodiments, an AOR may be defined by geographical or political boundaries.

The local restoration controllers communicate with IEDs in their area of responsibility that are associated with switches, breakers, and other substation/feeder control mechanisms. The local restoration controllers 24 include an IED data gateway 25 that facilitates communication between the local restoration controller and the IEDs. Further, the local restoration controller 24 may act as a communications gateway between IEDs and the OMS server 12, and/or can independently and automatically act on an outage in its responsible area. According to one embodiment, the local restoration controller resides inside a substation. In other embodiments, the local restoration controller may be outside a substation, so long as the location is secure and has a communication link to both the OMS server 12 and the IEDs in its area of responsibility.

Each local restoration controller 24 includes a local restoration switching analysis (RSA) engine 26 that generates a local restoration switching plan (RSP) when the local restoration controller detects a fault condition in its responsible area. As will be discussed in greater detail below, a restoration switching plan is a series of switching commands intended to both isolate a faulted zone and restore power to as many outaged/unserved loads as possible. The restoration switching analysis engine requires a local network model 28 to find and identify appropriate back-feeding paths. The local network model 28 is a trimmed model from the full model residing at the OMS server 12. According to one embodiment, the trimmed model includes all the types of information contained in the full OMS model, while encompassing a smaller electrical or geographical area. According to one embodiment, trimming follows the borders of area of responsibility (AOR) for operators. The energization status of bordering network components (which are typically the interconnection lines between the AORs), are coordinately determined by the local restoration controller and the OMS server. For example, the local restoration controllers send the energization and/or open/close status of the adjacent components (to the bordering components) to the OMS server. Thereafter, the OMS server determines the energization status of the bordering components and transmits the information back to all the related local controllers. Related local controllers may be those local restoration controllers that have equipment directly affected by bordering components. The use of a trimmed network model reduces the computation requirements, thereby allowing the industrial computer to be less powerful. Further, the use of a trimmed model speeds up the RSP calculations in the RSA because a smaller data set is processed.

Each local restoration controller 24 further includes an execution coordinator 30 that monitors the distribution network through the IED data gateway. If a fault occurs, and one of the reclosers completes the reclosing sequence and locks out, the coordinator 30 recognizes the lock-out as a triggering event and in turn, executes the RSA engine 26. Using the trimmed network model 28, the local RSA engine 26 attempts to generate an RSP. If the attempt fails, the coordinator 30 transmits a request to the OMS server (or control room application, collectively the OMS server) to generate a global RSP. The RSP of the OMS is global in the sense that the solution and/or switching operations affect a plurality of areas of responsibility. The local RSA engine may fail if, for example, 1) all potential local RSPs cause network violations (current, voltage or others) or 2) the potential back-feeding path is through bordering network components and the local restoration controller requires more information from the neighboring AORs.

By first attempting to generate the RSP at the local restoration controller, the computational loading on the OMS server is reduced, while at the same time increasing the speed at which the RSP is generated. The coordinator 30 acquires network status related information (metering data, switch positions, etc.) from the IED data gateway, and forwards this information to the OMS server at fixed time intervals or when significant changes occur (for example, an analog value change exceeds a fixed percentage, or a switch position changes due to automated protection control or manual switch control). All local restoration controllers forward these updates to the OMS server. In this manner, the full network model at the OMS server is always accurate. Subsequently, when the OMS server is called upon to generate a RSP, the network model it relies on is always valid.

The RSA engine 26 is an automated RSP generation process that works on operator defined parameters. The parameters control how the restoration switching sequence should be generated, how the sequences should be validated, and how an optimal RSP should be selected. When performing calculations, the RSA engine may use the pre-fault loading of the system or a forecasted loading of the system for back-feed restoration path searching. The pre-fault loading of the system can be maintained in the trimmed network model by acquiring metering data from the IEDs periodically or as needed.

If all switching devices in an RSP can be controlled remotely from local restoration controllers, when an RSP is generated at the local restoration controller, the coordinator 30 issues switching commands sequentially (according to the restoration switching sequences in the RSP) to the IEDs through the IED data gateway (with time delays in between to allow the switching command to be executed by the IEDs, and to handle exceptions should a switch fail to operate). When a local restoration controller executes an RSP, switch status changes, significant metering data changes and RSP execution results (ex. succeeded/failed) may be reported to the OMS so that the full network model is updated.

When an RSP is generated at the OMS server, the OMS server communicates with the coordinator 30 of each of the local restoration controllers to execute an RSP. Accordingly, the OMS sends the RSP to all the related local restoration controllers, and each local restoration controller instantiates an RSP execution object that contains direct communication IED objects (for switches controlled by or directly connected to the local restoration controller) and indirect communication IED objects (for switches not controlled by or directly connected to the local restoration controller). Thereafter, the local restoration controller with the direct communication IED object that corresponds to the first switching command in a restoration switching sequence (RSS) issues the corresponding switching command (through its IED data gateway), and reports the switching command execution result (switch opened/closed) to the OMS server (after a time delay to allow the switch to operate). When the OMS server receives the switching command execution report, it forwards the report to the other related local restoration controllers. When the forwarded switching operation execution report is received at a local restoration controller, the local restoration controller marks the RSS step (the switching device operation SD) as completed, and checks if the next step in the RSS corresponds to a direct communication IED object. If yes the local restoration controller issues the switching command, otherwise, the local restoration controller waits for the next forwarded switching operation executed report.

Figure 2:
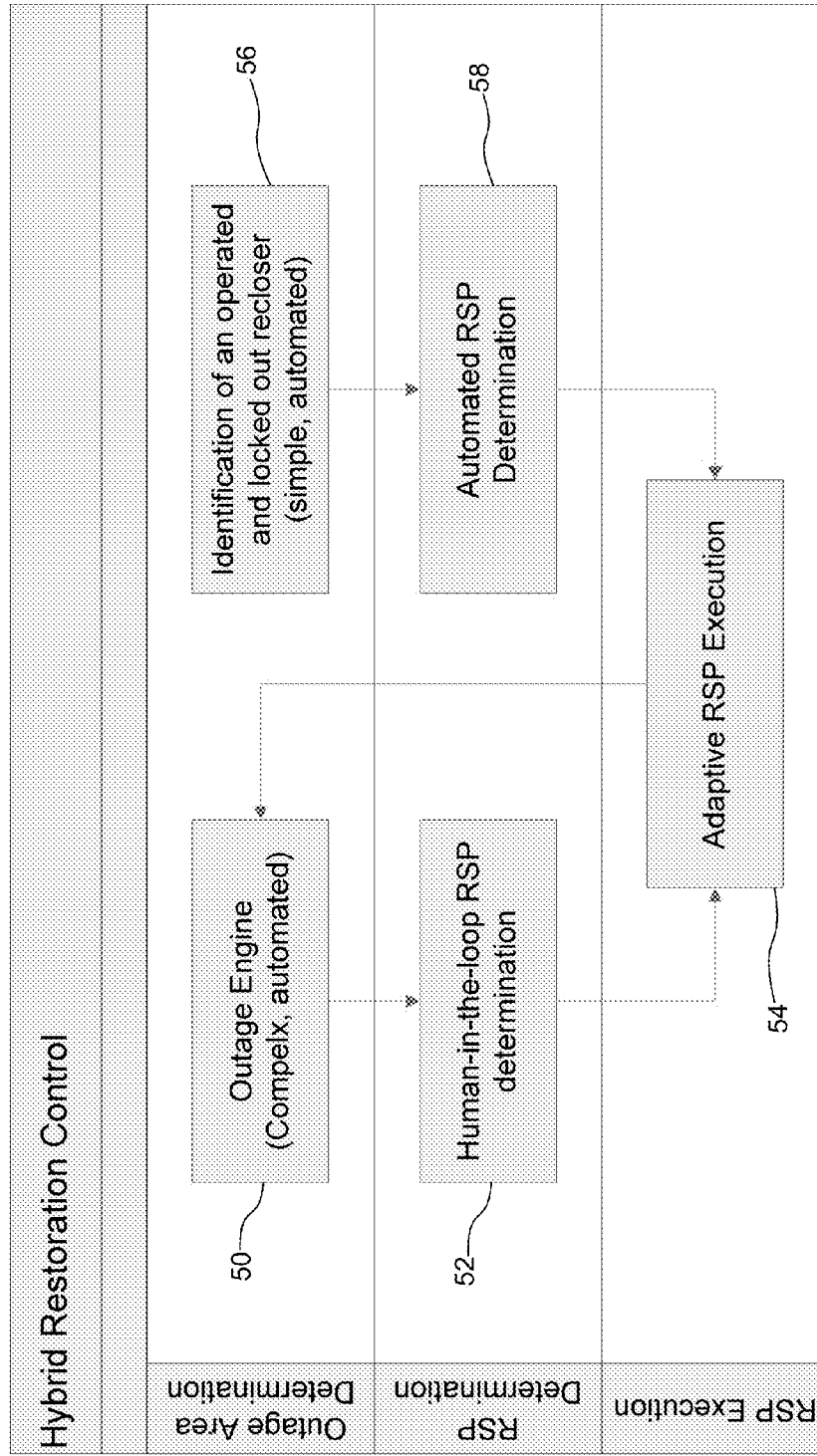
FIG. 2 is a flow chart illustrating certain aspects of the hybrid restoration system according to the present invention.

If not all switching devices in an RSP can be controlled remotely from local restoration controllers, the functionality of the restoration system 10 will now be described in greater detail below. With reference to FIG. 2, a process flow chart for the hybrid restoration system 10 is shown. When viewing FIG. 2, it should be appreciated that a restoration switching plan (RSP) includes at least one restoration switching sequence (RSS). Each RSS includes a series of switching device operations (SD), which identifies a local (manually controllable only) or remote controllable switch and an associated operation (open or close).

As discussed above, the overall process combines two types of fault zone identification and their associated RSP determination processes. With reference to FIG. 2, the left half is generally associated with OMS functionality, wherein an outage engine 50 receives inputs including customer calls, crew observations and some tele-metered data. Based on these inputs the outage engine 50 determines the fault zone (outage area). As discussed above, the outage engine 50 requires a model of the utility distribution system, complex tracing algorithms and deterministic rules. When the fault zone is determined, a human operator is notified (with flashing network sections that are outaged, or flashing fault symbols near the identified faulty components, for example) using the control room GUI application. At 52, the human operator of the OMS (the user of the OMS control room application) initiates a restoration switching analysis (RSA) to generate an RSP. In this process his/her experience and professional judgment are applied through the GUI of the OMS control room application, including the setting parameter selection of the RSA, and the result filtering and validation of the many possible RSP candidates.

In the right half of the overall process, at 56, operated or locked out reclosers are identified through direct monitoring by IEDs. An IED data concentrator or gateway based intelligent process, such as the local restoration controller discussed above, monitors the data (switch position, for example) for change events and determines if a recloser operated and locked out (by, for example, checking the reclosing and/or operation counter of the IED). If a permanent fault is recognized, at 58 an automated RSP determination process (at the local restoration controller) is triggered. Because the RSP determination is made at the local restoration controller, no operator involvement is required in this RSP determination process. Even if the RSP determination process doesn't yield valid RSP and the OMS server has to be called upon to determine a RSP, no operator is required. In this manner, the processing speed can be greatly improved.

Figure 3:
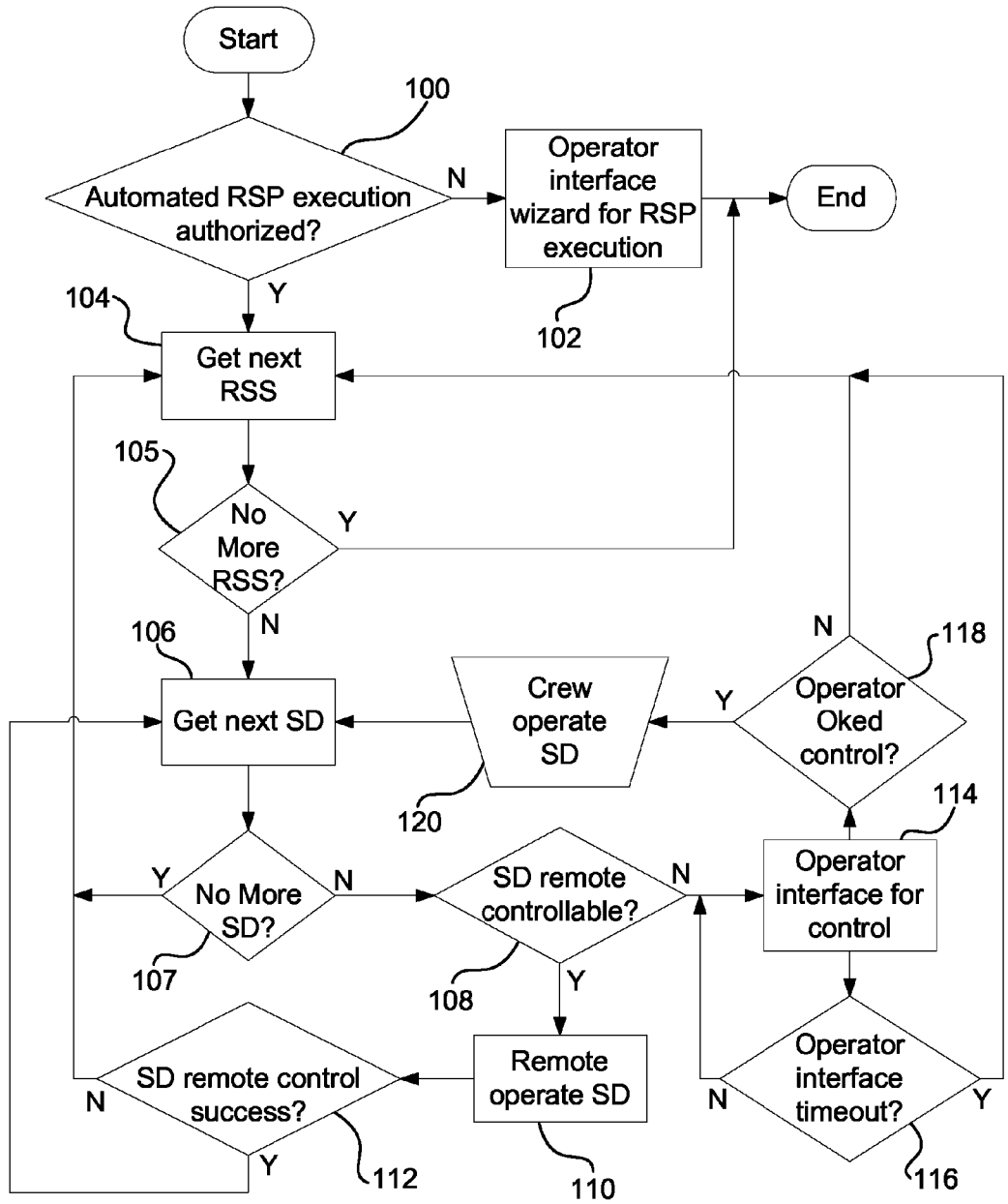
FIG. 3 is a flow chart illustrating the process flow of the present invention wherein the restoration switching sequence includes remote controllable switching devices and locally controlled switching devices.

After an RSP is determined, at 54, the completion of the RSP determination process triggers the adaptive RSP execution process, shown in greater detail in FIG. 3. As will be discussed below, the systems adapts based on the type of the involved switching devices and the result of the switching operations.

It should be appreciated that, even when an RSP is generated by the local restoration controller automatically, the RSP execution process may still involve a human operator if deemed necessary, such as when not all of the switching devices are remotely controllable, and the manually controllable switches must be operated by ground crews as directed by a human operator. In this scenario according to a first embodiment, an automated RSP execution not performed, and the RSP is sent to the OMS server and displayed to the human operator through the GUI of the OMS control room application. Thereafter, the human operator oversees the RSP execution process through an operator interface wizard, where the switching device operation commands are sent to ground crews and/or tele-metered switches. At any time, the human operator may terminate the execution of the RSP, whereupon the process returns to the outage engine 50. According to another embodiment, in the scenario above, the automated RSP execution may still be authorized, as will be discussed further below.

Most distribution systems include a mixed switching device portfolio—manual cutouts (example of local switches in the context of the present invention), tele-metered reclosers, sectionalizers, tie-switches, etc. Thus, the operator interface wizard based RSP execution is not necessarily the best choice, particularly in terms of execution speed. In such an environment, the automated RSP execution may be authorized, wherein operator intervention is called upon only when there is a need, such as crew dispatching to operate a switch in an RSS.

The examples above primarily discuss RSPs involving only remotely controllable switching devices. With reference to FIG. 3, an automated RSP execution is shown wherein the RSP includes both remote controlled and local (manually) controlled switches. This RSP execution process may take place at a single local restoration controller or coordinately with the OMS server and several related local restoration controllers, depending on where the RSP is generated (ex. at a local restoration controller or at the OMS). As will be discussed below, when a manually controllable switch is called for in an RSP, the OMS server (and thus the OMS control room application and the operator) are notified so that he/she can dispatch a ground crew to operate the switch.

An RSP execution authorization flag may be preset. According to other embodiments, an RSP execution authorization flag may be set by the OMS control room operator through the GUI and transmitted to each local restoration controller. Thus, a default setting could be to allow or not allow automated RSP execution, depending upon the system configuration. Using the OMS GUI, the operator may change the setting, wherein an RSP execution authorization flag is sent to the local restoration controller, overriding the default setting. When an automatic RSP execution starts, at 100 the RSP execution authorization flag is checked to determine whether automated RSP execution is authorized. If not, at 102, an operator interface wizard is presented to the human operator for manual RSP execution. If the automated RSP is authorized, the process begins at 104 by retrieving the first RSS. At 105 it is determined whether an RSS was retrieved at step 104. If so, at 106 the next/first switching device is retrieved. At 107 it is determined if an SD was retrieved at 106. If so, at 108, a check is performed to determine if the corresponding SD is remote controllable. If the SD is remote controllable, at 110 the control command is sent over the DA/FA infrastructure to the SD. The remote controllable switching devices are monitored for device control failure events at 112. Should this happen, the corresponding RSS is marked as "failed" and no further switching will take place in the corresponding RSS. This ensures the integrity of the network, i.e. the protection and control interlocking criteria are not violated. The system may then move on to the next RSS.

If the SD is not remote controllable, at 114 the operator interface window will popup on the screen of the control room GUI application so the human operator can assign ground crews to execute the manual switching operation. Some operating scenarios may involve more than one restoration switching sequence (RSS) wherein one or more RSS requires an operator assisted switching operation. At 116, the human operator may be timed and if there is no response after a predetermined period of time, the process continues to the next RSS. In this manner, as much of an RSP is carried out as possible in light of the human operator's unavailability.

If the operator OKs the control at 118, the system awaits confirmation that the crew operated the SD at 120. When confirmation is received, the process continues to the next SD. Confirmation may be received when the ground crew radios or otherwise communicates with the operator indicating that the switching operation is complete. At that time, the operator may input the data into the GUI, which then causes the OMS to transmit the information to the local restoration controllers.

An operator may choose to terminate the execution of an RSS, if necessary, by declining a crew assisted switching operation. In this case the RSS is marked as "terminated". However, when the operator interface simply times out, the RSS is marked as "pending" and does not terminate. In either event, the next available RSS is executed. According to one embodiment, all the RSS may be executed simultaneously using a multi-thread procedure.

Figure 4:
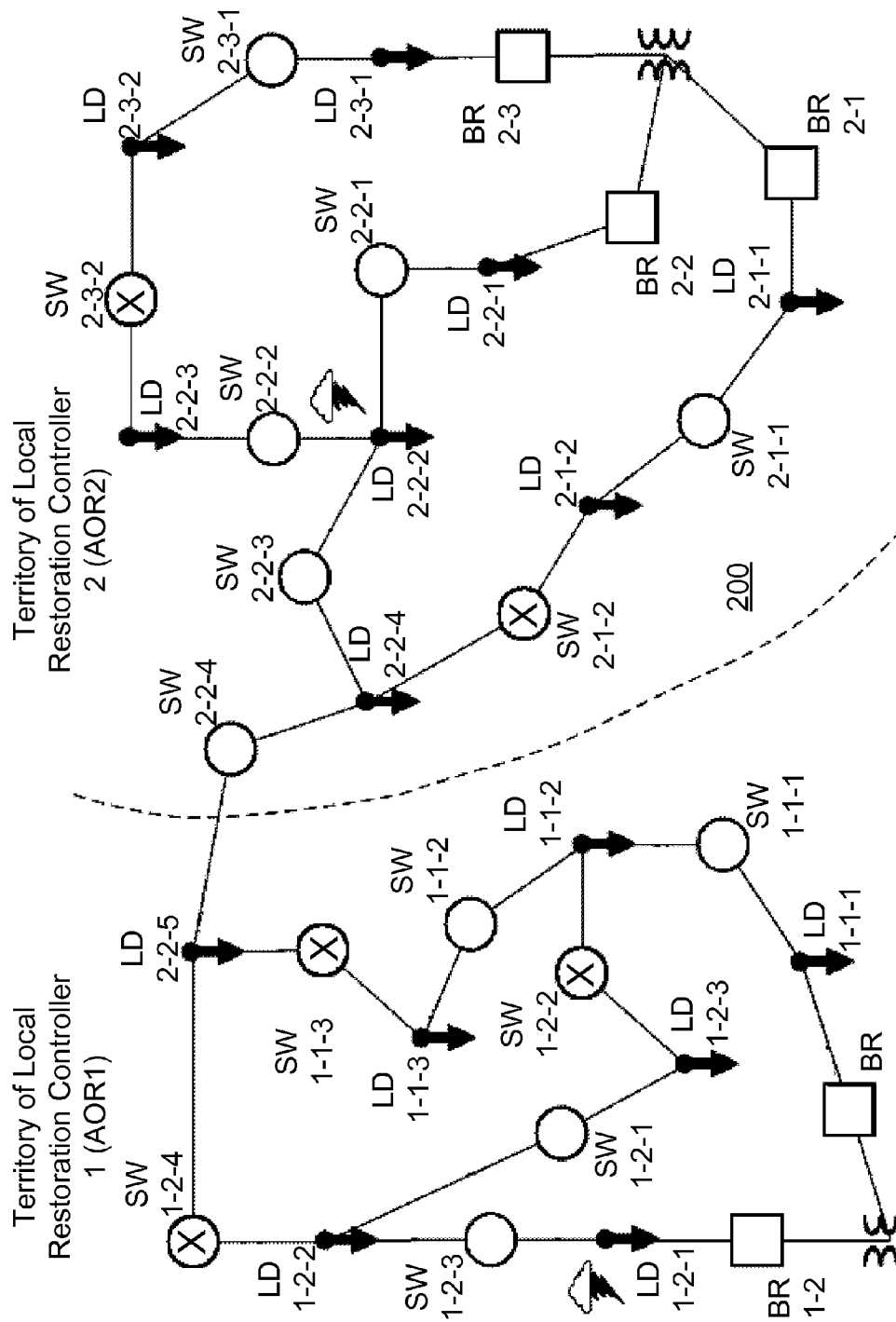
FIG. 4 is an exemplary distribution network having two areas of responsibility.

By way of example, and with reference to FIG. 4, an example distribution network is shown wherein all switches are remotely controllable. The network 200 is monitored by a single OMS located at a utility control facility. The network includes two distinct areas of responsibility (AORs). A first AOR (AOR1) is powered by source S1 and the second AOR (AOR2) is powered by source S2. A first local restoration controller LRC1 is proximate to source S1 and a second local restoration controller is proximate to source S2. As discussed above, LRC1 stores a trimmed network model of the AOR1, and LRC2 stores the trimmed network model of the AOR2. The OMS maintains the full network model of both AOR1 and AOR2.

AOR1 includes two feeders. Feeder 1-1 includes feeder breaker Brk1-1, switches SW1-1-1, SW1-1-2 and SW1-1-3, and loads LD1-1-1, LD1-1-2 and LD1-1-3. Feeder 1-2 includes feeder breaker Brk1-2, switches SW 1-2-1, SW1-2-2, SW1-2-3 and SW1-2-4, and loads LD1-2-1, LD1-2-2 and LD1-2-3. According to the present example, all feeder breakers and switches are remotely controllable through LRC1.

AOR2 includes three feeders. Feeder 2-1 includes feeder breaker Brk2-1, switches SW2-1-1 and SW2-1-2, and loads LD2-1-1 and LD2-1-2. Feeder 2-2 includes feeder breaker Brk2-2, switches SW2-2-1, SW2-2-2, SW2-2-3 and SW2-2-4, and loads LD2-2-1, LD2-2-2, LD2-2-3, LD2-2-4 and LD2-2-5. Feeder 2-3 includes feeder breaker Brk2-3, switches SW2-3-1 and SW2-3-2, and loads LD2-3-1 and LD2-3-2. According to the present example, all feeder breakers and switches are remotely controllable through LRC2.

If a fault (Fault 1) occurs at load LD1-2-1. The reclosing function of the electronic relay of Brk1-2 will sense this fault and cycle through a reclosing sequence. If the fault does not self-clear, the recloser will lock out, opening Brk1-2. Because Brk1-2 includes an IED, LRC1 is notified of the fault. Upon sensing the fault, the RSA engine at LRC1 is executed. The RSA engine determines first how to isolate the fault. In the present example, the fault may be isolated by opening switch SW1-2-3. Thereafter, loads LD1-2-1 and LD1-2-2 remain unserved. Back-feeding may restore power to the unserved loads by either closing switch SW1-2-4 or SW1-2-2. However, if switch SW1-2-4 is closed, power will be drawn from source S2 in AOR2. Because LRC1 does not have the network model and information of AOR2, it cannot completely model tie switch SW1-2-4 for power restoration to loads LD1-2-2 and LD1-2-3. Specifically, because the model is trimmed, it cannot determine whether opening SW1-2-4 violates any voltage or other constraints in AOR2.

If, however, switch SW1-2-2 is closed, all required modeling is local to AOR1. Thus the trimmed model is capable of determining an RSP. According to one embodiment, the local restoration controller determines that the best RSP is that which is executable locally, in a single AOR. This may be determined to be the "best" solution, even if, according to other criteria (e.g. load balancing), other solutions are optimal. If feeder 1-1 has enough capacity, the RSA engine generates an RSP that restores power to loads LD1-2-2 and LD1-2-3 by closing SW1-2-2, after switch SW1-2-3 is opened to isolate the fault. According to this scenario, the OMS server RSA engine is not required and therefore not executed.

According to a second example, if a fault (Fault 2) occurs at load LD2-2-2, and switch SW2-2-1 is a recloser, switch SW2-2-1 will sense the fault, and initiate the reclosing sequence. If the fault does not self-clear, SW2-2-1 locks out. Because SW2-2-1 includes an IED, LRC2 is notified of the fault. Upon sensing the fault, the RSA engine at LRC2 is executed. The RSA engine determines first how to isolate the fault. In the present example, the fault may be isolated by opening switch SW2-2-3 and SW2-2-2. Thereafter, loads LD2-2-4 and LD2-2-5 remain unserved. Back-feeding may restore power to the unserved loads by closing either SW1-2-4, SW1-1-3 or SW2-1-2. However, if switch SW1-2-4 or SW1-1-3 is closed, power will be drawn from source S1 in AOR1. Because LRC2 does not have the network model and information of AOR1, it cannot completely model tie switches SW1-2-4 or SW1-1-3 for power restoration to loads LD2-2-4 and LD2-2-5. Specifically, because the model is trimmed, it cannot determine whether opening either switch SW1-2-4 or SW1-1-3 violates any voltage or other constraints in AOR1.

If, however, switch SW2-1-2 is closed, all required modeling is local to AOR2. Thus the trimmed model is capable of determining an RSP. If feeder 2-1 has enough capacity, the RSA engine will generate a RSP to restore power to loads LD2-2-4 and LD2-2-5 by closing SW2-1-2, after switch SW2-2-3 is opened to isolate the fault. The RSA engine may also generate another RSP to restore power to LD2-2-3 by closing SW2-3-2, after switch SW2-2-2 is opened to isolate the fault. In this scenario, the OMS server RSA engine is not required and therefore not executed.

Returning to the example of Fault 1. If feeder 1-1 does not have sufficient capacity to restore power to loads LD1-2-2 and LD1-2-3, the RSA in LRC1 will determine that no local RSP is possible to restore power to LD1-2-2 and LD1-2-3. In such a case, LRC1 will notify the OMS server RSA engine of the fault, and a valid RSP will be generated by the OMS server RSA. The resulting RSP is then sent to both LRC1 and LRC2 for execution. For Fault 1, the OMS server RSA generated RSP may call for switch SW1-2-3 to open and then to close switch SW 1-2-4. Though both of these operations may be executed by LRC1, it was important that the whole network model was used, to ensure no parameter violations in AOR2.

In the example of Fault 2, if feeder 2-1 does not have enough capacity to restore power to loads LD2-2-4 and LD2-2-5, the RSA in LRC2 will determine that no local RSP is possible to restore power to loads LD2-2-4 and LD2-2-5. In such a case, LRC2 will notify the OMS server RSA engine of the fault, and a valid RSP will be generated by the OMS server RSA. The resulting RSP is then sent to both LRC1 and LRC2 for execution. For Fault 2, the OMS server RSA generated RSP may call for switch SW2-2-3 open and then to close switch SW1-1-3. The first "switch open" operation is executed though LRC2, and the second "switch closed" operation is executed through LRC1.

Execution of an RSP requires all the involved LRC execution coordinators to create a job consisting of a sequence of switching operation entries. Each entry is an object having four attributes: the identifier of the switch (switch ID), the switch operation command (open or close), the status of the switch, and an indication whether the IED is in direct communication with the LRC (and thus controllable by the LRC). When the LRC receives switch status information from the IEDs (either directly or through the OMS server), the switch status of the entry is the present switch position ("open" or "closed") read from the IED. Each LRC processes the job entries in sequence. For each entry, a check is performed that the corresponding switch is under the particular LRC's direct control. If so, the LRC may send a security check request to the OMS server. Upon receipt, the OMS server checks if any risks are present in executing the switch operation (for example, when a do-not-operate tag is added to a switch by the OMS operator between the start of the RSP execution and the time that the switch is to be operated, it may mean that operation of the switch could cause equipment or crew safety concerns). The security check result is sent back to the requesting LRC and, if the switching operation is approved, the LRC will issue the switch control command. If the switching operation is not approved, the RSP execution is suspended and the OMS server is notified. After issuing the switch control command, the LRC checks the status (position) of the switch (through the associated IED) and notifies the OMS server, the OMS server in turn broadcasts the new switch status to all other LRCS.

If a job entry calls for a switching operation for a switch not under the direct control of a particular LRC, that LRC will wait for the broadcasting of the status of the switch from the OMS server. When an LRC receives the switch status message from the OMS server, that LRC will proceed to the next entry in the switching operation sequence.

An RSP may be sent to the LRCS as an object or a message, depending on what software middleware is used to communicate between the OMS server and the LRCS. The format of the object or message is not critical, so long as the necessary information is conveyed, including the switch ID, the corresponding operation and the sequence order.

As can be appreciated by one of ordinary skill in the art, the present invention may take the form of a computer program product on a computer-usable or computer-readable medium having computer-usable program code embodied in the medium. The computer-usable or computer-readable medium may be any medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or propagation medium or even be paper or other suitable medium upon which the program is printed. More specific examples (a non-exhaustive list) of the computer-readable medium would include: an electrical connection having one or more wires, a portable computer diskette, a flash drive, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Computer program code for carrying out operations of the present invention may be written in an object oriented programming language such as Java, Smalltalk, C++ or the like, or may also be written in conventional procedural programming languages, such as the "C" programming language. The program code may execute entirely in a DMS system, or a separate computer as a stand-alone software package.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

We claim:

1. A power outage restoration system for managing a power network including a plurality of switching devices, said power outage restoration system comprising:
    an outage management system having a network model of said power network, said outage management system including an outage engine that uses said network model for generating restoration switching plans;
    a plurality of local restoration controllers in communication with said outage management system, each said local restoration controller having a distinct associated local restoration controller area of responsibility which is a portion of said power network, each said local restoration controller including a trimmed network model correlating to the respective local restoration controller area of responsibility, each said local restoration controller further including a switching analysis engine that uses said trimmed network model for generating said restoration switching plans; and
    wherein each said local restoration controller is operable to detect faults in its associated area of responsibility, when a fault is detected the respective local restoration controller switching analysis engine attempts to generate a restoration switching plan, and if said switching analysis engine fails, a request is sent to said outage management system for said outage engine to generate a restoration switching plan.

2. The power outage restoration system according to claim 1 wherein each said local restoration controller is geographically remote from said outage management system.

3. The power outage restoration system according to claim 1 wherein each said local restoration controller includes a data gateway for communication with said switching devices.

4. The power outage restoration system according to claim 3 wherein said local restoration controller functions as a communications gateway between said switching devices and said outage management system.

5. The power outage restoration system according to claim 1 wherein said network model comprises a mathematical representation of physical network components and the connecting relationships of said physical network components.

6. The power outage restoration system according to claim 1 wherein said created restoration switching plan is a series of switching operations executable to isolate a faulted portion of said power network and to backfeed outaged portions of said power network.

7. The power restoration system according to claim 1 wherein said local restoration controller switching analysis engine's attempt to generate a restoration switching plan fails if all potential restoration switching plans cause a current or voltage network violation.

8. The power restoration system according to claim 1 wherein said local restoration controller switching analysis engine's attempt to generate a restoration switching plan fails if the only viable restoration switching plan affects said power network in other local restoration controller areas of responsibility.

9. A method of managing a power network including a plurality of switching devices, the method comprising:
    providing an outage management system having a network model of said power network, said outage management system including an outage engine;
    providing a plurality of local restoration controllers in communication with said outage management system, each said local restoration controller having a distinct local restoration controller area of responsibility which is a portion of said power network, each said local restoration controller including a trimmed network model correlating to the respective local restoration controller area of responsibility, each said local restoration controller further including a switching analysis engine;
    monitoring said power network by said local restoration controllers;
    if a fault occurs in an area of responsibility, using said switching analysis engine at the respective local restoration controller to determine a local restoration switching plan;
    if said local restoration switching plan is deficient, using said outage engine to determine a global restoration switching plan; and
    executing said global or said local restoration switching plan to restore power to one or more outaged sections of said power network.

10. The method of claim 9 wherein said local restoration switching plan is deficient if all potential local restoration switching plans cause a current or voltage network violation.

11. The method of claim 9 wherein said local restoration switching plan is deficient if the only viable local restoration switching plan affects said power network in other local restoration controller areas of responsibility.

12. The method of claim 9 wherein said local and global restoration switching plans each comprise a series of switching operations executable to isolate a faulted portion of said power network and to backfeed outaged portions of said power network.

13. The method of claim 12 wherein said step of executing said global restoration switching plan further comprises transmitting said global restoration switching plan to each said local restoration controller wherein a switching operation is required.

14. The method of claim 12 wherein said step of executing said local restoration switching plan further comprises sequentially transmitting said switching operations to the switching devices in the area of responsibility of the local restoration controller.

15. The method of claim 9 further comprising:
    wherein said local and global restoration switching plans each comprise a sequential series of switching operations including manual switching operations and remote controllable switching operations, said local and global restoration switching plans being executable to isolate a faulted portion of said power network and to backfeed outaged portions of said power network;

sequentially executing each said switching operation to execute said global or said local restoration switching plan; and wherein if said switching operation is a manual switching operation, transmitting a command to a ground crew to manually execute said switching operation and if said switching operation is a remote controllable switching operation, transmitting a switch command to the switching device to execute said switching operation.

\* \* \* \* \*